July 23, 1935.  J. T. CONNOLLY  2,008,977
SADDLE
Filed May 25, 1934
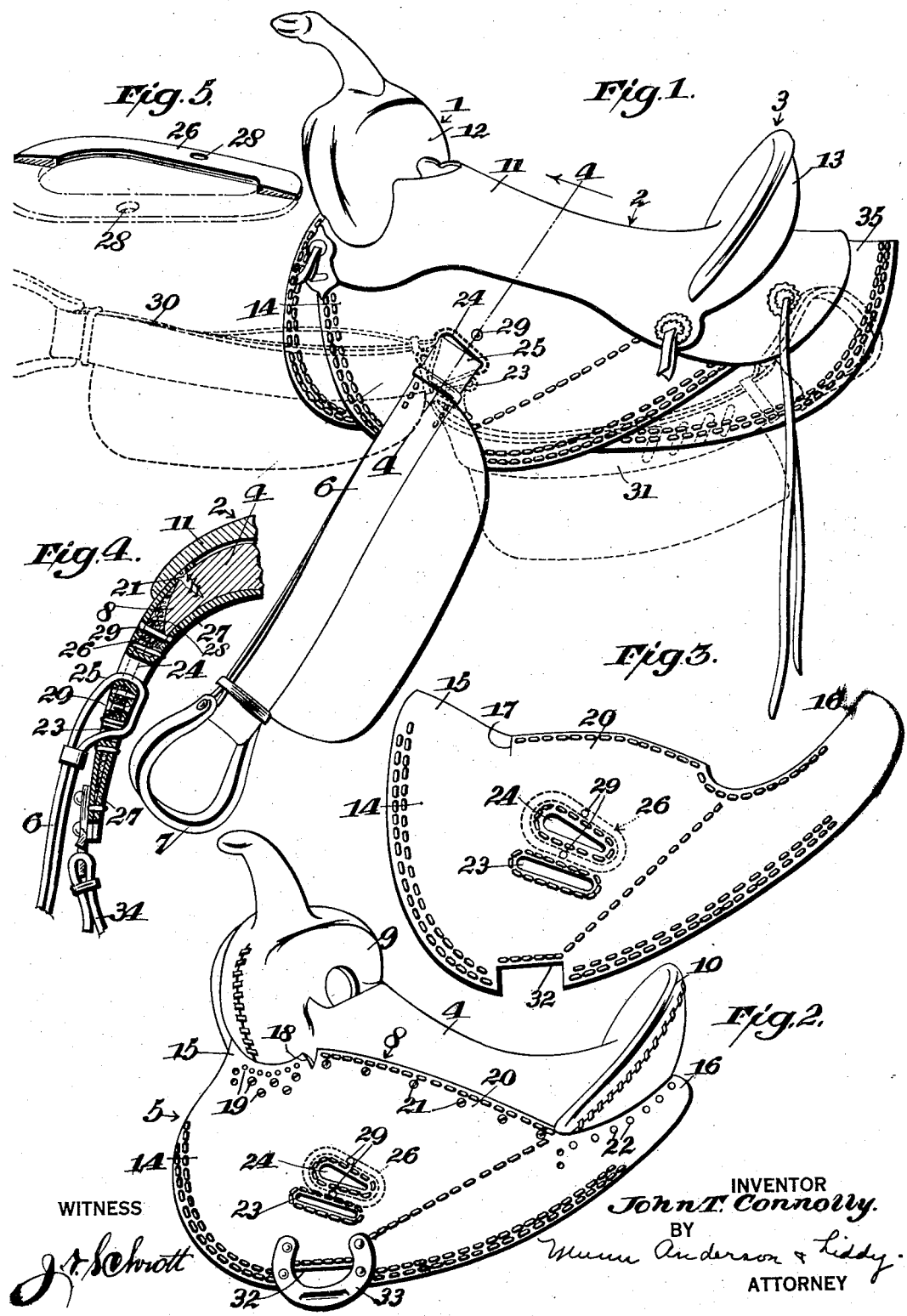
WITNESS
J. T. Schrott
INVENTOR
John T. Connolly.
BY
Munn Anderson & Liddy.
ATTORNEY Patented July 23, 1935

2,008,977

UNITED STATES PATENT OFFICE 2,008,977

SADDLE

John T. Connolly, Livingston, Mont.

Application May 25, 1934, Serial No. 727,547

7 Claims. (Cl. 54—44)

This invention relates to improvements in saddles, and its objects are as follows:—

First, to provide a saddle so constructed as to make possible an equal distribution of the weight of the rider on the animal and so obtain a better balance for the rider in roping and riding.

Second, to so suspend the stirrups as to more equally distribute the weight thereon and eliminate tight cinching.

Third, to further enable evening up the weight as brought out above, by attaching the rigging to the tree in a novel manner and so locating the slots in the rigging as to enable the desired suspension of the stirrups.

Fourth, to avoid cutting a runway in the saddle tree for the stirrup leathers and to avoid disposing the stirrup leathers across the tree for the respective purposes of preventing the seat from breaking down and for equally distributing the bearing of the saddle on the horse as well as eliminating a raise in the saddle lining which causes the saddle to tip forward and backward.

Fifth, to attach the rig to the bars of the tree thereby equally distributing the strain of the cinch or girth strip, eliminating tight cinching and cinch-ring sores on the horse.

In the drawing:

Figure 1 is a perspective view of the improved saddle in its complete form, particularly illustrating the freedom of action of the stirrup leathers.

Figure 2 is a detail perspective view of the saddle tree and rig alone.

Figure 3 is an elevation of one of the side flaps constituting part of the rig, the position of the metal reinforcing ring being shown in dotted lines.

Figure 4 is a cross section taken substantially on the line 4—4 of Figure 1.

Figure 5 is a fractional perspective view of the foregoing reinforcing ring.

Those parts of the saddle immediately concerned with the invention generally comprise the pommel 1, seat 2, cantle 3 (Fig. 1), tree 4 (Fig. 2), rig 5, stirrup leathers 6 and stirrups 7. The tree 4 (Fig. 2) is a rigid structure which includes side bars 8. The pommel and cantle bases 9, 10 are made integrally with the saddle tree. A seat pad 11 (Fig. 1) is fitted on the tree in a covering position, and this pad includes pommel and cantle covers 12 and 13 which go over the respective bases 9, 10.

The rig, generally designated 5 (Fig. 2) consists of a pair of side flaps 14 (Fig. 3). Each has a forepart 15 and a tail 16. A slit or notch 17 (Fig. 3) spreads as at 18 (Fig. 2) when the forepart 15 is secured to the pommel base 9 by the means 19 and when the intermediate part 20 is secured to the respective side bar 8 by the means 21. The tail 16 is secured in back of the cantle base 10 by the means 22.

There are two slotted openings 23, 24 in each side flap 14 to receive the loop 25 of the stirrup leather 6. The contours of these openings as well as some of the marginal portions of the side flap are bounded by a row or rows of stitching as plainly shown. The top opening 24 is reinforced by a metal ring or eyelet 26 (Fig. 5). This ring goes between the flap 14 and its lining 27 (Fig. 4). The foregoing rows of stitching secure the lining to the respective side flap and so aid in confining the customary filling in the space between.

The ring has at least two holes 28 (Fig. 5) to receive the securing rivets 29 (Fig. 4). One of the front faces of the ring is made sloping so that the outer edge is thinner than the inner edge. This provides a cross section which makes for a better adaptation of the ring to its position between the respective side flap and lining.

It is to be observed that the openings 23, 24 are substantially centered with respect to the respective side flap 14. When weight is imposed on the stirrup leather 6, the reinforcing ring 26 being for the purpose of preventing the tearing out of the rig structure, said weight is distributed on the back of the horse so nearly equally that the physical comfort of both the rider and horse are greatly enhanced. The attachment of the stirrup leathers to the rig (which term is applied collectively to the side flaps 14) avoids cutting a runway in the tree 4 and so materially weakening the seat 2 as to raise the possibility of its breaking down.

Another purpose in so suspending the stirrup leathers is to enable an absolutely free swinging as depicted by the dotted line positions 30, 31 in Figure 1. The rider may place his feet in any position within the limits depicted and so have the riding comfort added to greatly.

Reverting to the rig 5, each side flap 14 has a cut out 32 in the lower margin. An iron 33 secured to the side flap at this point receives one end of a girth or cinch strap 34 (Fig. 4) which goes under the horse to a similar iron on the other side. The attachment of the rig 5 to the bars 8 of the tree 4 (Fig. 2) provides such equality in the distribution of the strain of the girth or cinch strap that the latter does not have to be drawn as tightly as is the custom. The saddle will stay in place with less pressure on the cinch strap and so tend to avoid cinch-ring sores on the horse.

Before mounting the saddle on the horse a sweat pad 35 (Fig. 1) is emplaced first. The saddle is then laid on the sweat pad and the cinch or girth strap 34 applied. Figures 1 and 2 are intended to show the complete saddle and the foundation work for the saddle. When the seat pad 11 and the pommel and cantle covers 12, 13 are built upon the respective tree 4 and the pommel and cantle bases 9, 10 the seat pad will be held in position firmly.

I claim:—

1. A saddle comprising a seat, a rig including a pair of side flaps pendent from the sides of the seat, a pair of stirrup leathers and a stirrup carried by each leather, and means for loosely attaching each stirrup leather to the respective side flap at points substantially centered on the side flaps.

2. A saddle comprising a seat, a rig including side flaps pendent from the sides of the seat, each side flap having a pair of openings, a pair of stirrup leathers and a stirrup carried by each leather at one end, and a loop at the other end of each leather fitted through the respective openings to provide a loose attachment for the stirrup leather, said openings being substantially centered with respect to each side flap.

3. A saddle comprising a seat, a tree included in the seat, said seat having side bars, a rig pendent from the seat, said rig including side flaps and means by which each side flap is secured to the respective side bar of the tree, each of said side flaps having pairs of openings substantially centered with respect thereto, a pair of stirrup leathers and a stirrup carried by each leather, and loops included in the stirrup leathers loosely affixed to the side flaps at the openings.

4. A saddle comprising a seat, a tree included in said seat, said tree having pommel and cantle bases at its longitudinal extremities and having side bars extending longitudinally of the tree, a girth strap, a rig including side flaps, each side flap having fore, intermediate and tail parts along its upper margin, means for attaching the girth strap to the lower margins of the side flaps, and means for securing the fore, intermediate and tail parts to the respective pommel base, side bars and cantle base.

5. A saddle comprising a seat, a tree included in the seat, said tree having pommel and cantle bases and side bars situated longitudinally of the tree between said bases, a girth strap, a rig suspended from the seat, said rig including flaps each having a pair of openings in the substantial center and each having fore, intermediate and tail parts along the upper margins, irons secured to the lower margins of the side flaps to which the girth strap is attached, and means to secure said fore, intermediate and tail parts to the respective pommel base, side bars and cantle base.

6. In a saddle, a side flap to constitute part of a rig, said side flap including a lining, there being fore, intermediate and tail parts along the upper margin of the flap, and a pair of holes in the substantial center of the flap, said holes going through the lining, and there being a reinforcing ring around one of the holes inside of the flap, one of the faces of the ring being sloping.

7. A saddle comprising a seat, tree, side flaps secured to the tree so as to lie against the sides of an animal, said flaps having slotted openings at points substantially centered on the side flaps, stirrup leathers which have loops which are put through the slotted openings so as to suspend said leathers, and metal eyelets reinforcing the openings so that the loops will not wear the margins of said openings.

JOHN T. CONNOLLY.